United States Patent
Lee

(10) Patent No.: US 7,218,621 B2
(45) Date of Patent: May 15, 2007

(54) METHOD FOR DYNAMIC ALLOCATION OF CHANNELS IN A CODE DIVISION MULTIPLE ACCESS PACKET DATA SYSTEM

(75) Inventor: Seoung-Young Lee, Kyoungki-Do (KR)

(73) Assignee: LG Nortel Co., Ltd., Seoul (KR)

( * ) Notice: Subject to any disclaimer, the term of this patent is extended or adjusted under 35 U.S.C. 154(b) by 646 days.

(21) Appl. No.: 09/745,873

(22) Filed: Dec. 26, 2000

(65) Prior Publication Data

US 2001/0005378 A1 Jun. 28, 2001

(30) Foreign Application Priority Data

Dec. 23, 1999 (KR) .............................. 1999-60778

(51) Int. Cl.
*H04B 7/216* (2006.01)
*H04B 1/00* (2006.01)
*H04J 13/00* (2006.01)
*H04Q 7/20* (2006.01)

(52) U.S. Cl. .................. 370/335; 370/342; 370/441; 370/479; 455/450; 375/130

(58) Field of Classification Search ................ 370/320, 370/335, 342, 441, 450, 479, 459; 375/130, 375/140, 141, 145; 455/450, 452.1
See application file for complete search history.

(56) References Cited

U.S. PATENT DOCUMENTS 5,592,470 A * 1/1997 Rudrapatna et al. ........ 370/320
5,604,730 A * 2/1997 Tiedemann, Jr. ............ 370/252
5,669,062 A * 9/1997 Olds et al. .................. 455/509
5,809,423 A * 9/1998 Benveniste .............. 455/452.2
5,991,332 A * 11/1999 Lomp et al. ................. 375/152
6,021,123 A * 2/2000 Mimura ...................... 370/331
6,269,088 B1 * 7/2001 Masui et al. ................ 370/335
6,728,233 B1 * 4/2004 Park et al. .................. 370/342
6,973,062 B1 * 12/2005 Han ........................... 370/335

OTHER PUBLICATIONS

Buczynski, et al.; "Performance of a DS-CDMA System with Dynamic Channel Allocation and Soft Handover"; IEEE 5th International Symposium on Spread Spectrum Techniques and Applications; Sep. 2-4, 1998; vol. 2; pp. 420-424.*

* cited by examiner

Primary Examiner—Chi Pham
Assistant Examiner—Tri H. Phan
(74) Attorney, Agent, or Firm—Ked & Associates, LLP

(57) ABSTRACT

A CDMA packet data system is disclosed that can dynamically allocate channels in the CDMA packet data system). Using the disclosed dynamic allocation method, the utilization efficiency of multiple channels is increased and the transmission rate of packet data is increased. This is because a static, specific channel is not allocated to each terminal, but rather the system dynamically allocates multiple channels to each mobile terminal. Thus, the base station provides information on all channels used in the system to multiple terminals. The terminals check the occupied state of each channel before transmitting packet data, and thereafter transmitting packet data through an unoccupied channel.

25 Claims, 4 Drawing Sheets

METHOD FOR DYNAMIC ALLOCATION OF CHANNELS IN A CODE DIVISION MULTIPLE ACCESS PACKET DATA SYSTEM

BACKGROUND OF THE INVENTION

1. Field of the Invention

The present invention relates to a Code Division Multiple Access (CDMA) packet data system, and more particularly, to a method for dynamic allocation of channels in a CDMA packet data system.

2. Background of the Related Art

Generally, a CDMA transmitter transmits data by multiplying a PN (Pseudo Noise) code after spreading the spectrum of the transmit frequency, and a CDMA receiver demodulates the data to the original bandwidth by multiplying the same PN code as that in transmission.

FIG. 1 illustrates a block diagram of a related art CDMA packet data system. The system includes a base station 20 and a plurality of terminals 1–N.

The plurality of terminals 1–N are typically grouped in as many groups as there are channels used in one base station 20. Channels in the CDMA system are distinguished by unique PN codes. For example, if a system has six terminals 1–6 (i.e., N is 6) and three channels in one base station 20, this base station 20 classifies the six terminals 1–6 into three groups. Each group uses one channel.

Terminals using the same channel (terminals in the same group) each monitor the occupied state of the channel in order to prevent collisions with data transmitted by other terminals in the channel. Thus, if one terminal in a group detects that the other terminals in the same group (and thus using the same PN code as that used by itself) are not currently occupying the channel, it starts to transmit data through the channel. In determining whether or not the channel is occupied, an idle signal transmitted from the base station to the terminal is used.

In the related art system, the terminal has to transmit packet data through the corresponding, pre-allocated channel, and cannot use other channels. This method for static allocation of channels in the related art CDMA packet data system will now be described in more detail.

If the number of channels used in the base station 20 is three, and there are six terminals 1–6 for this base station 20, the base station 20 allocates a channel to each terminal 1–6. For example, channel A is allocated to terminal 1, terminal 2, and terminal 3, channel B is allocated to terminal 4, and channel C is allocated to terminal 5 and terminal 6.

Terminals in each channel can access the base station 20 independently of other channels. The CDMA system distinguishes channels using a PN seed. That is, terminal 1, terminal 2, and terminal 3 use the same PN seed, but the terminals in channel A and the terminal in channels B and C use different PN seeds.

With respect to channel A, as shown in FIG. 2, terminal 1 detects whether or not channel A is in the idle state in step ST1. If it is determined that channel A is idle, terminal 1 transmits packet data through channel A, as shown in step ST2.

If a packet of data to be transmitted by terminal 3 is generated after terminal 1 transmits one packet of data in this way, terminal 3 also detects whether or not channel A is in the idle state, according to step ST1. If channel A is idle, the packet of data of terminal 3 is transmitted through channel A, as shown in step ST2.

In this way, terminal 1, terminal 2, and terminal 3 each transmit data packets through channel A without collision with other data at different time intervals in a uniform order.

With respect to channel B and channel C, data is transmitted without collision with other data in the same way as described for channel A.

A method of detecting the occupied state of a channel in the related art system will now be described. Generally, packet data transmitted from a terminal consists of a preamble and data. The preamble is used by the base station in order to acquire the synchronization and phase of data transmitted from the terminal.

When terminal 1 transmits a packet of data to the base station 20 through channel A, the base station 20 transmits a power control signal through channel A to terminal 1. This enables terminal 1 and the base station 20 to maintain a constant power after acquiring synchronization and phase using the preamble of the packet data. Therefore, terminal 1 performs power control using this power control signal, and the other terminals (terminal 2 and terminal 3) not transmitting packet data do not transmit data because they recognize this power control signal as a channel occupancy signal.

Once the packet data has been received through channel A, the base station 20 does not perform power control anymore. Instead, it transmits an idle signal to the terminal side through channel A. Therefore, the terminals (terminal 1, terminal 2, and terminal 3) allocated to channel A detect that channel A is not occupied, and a terminal of that channel having packet data to be transmitted thus transmits data.

This method of channel allocation has various problems. For example, terminal 4 (allocated to channel B) and terminals 5 and 6 (allocated to channel C) cannot access channel A. In addition, the terminals allocated to channel A cannot access channel B or channel C. Thus, when channel A is busy and channel B is idle, the terminals allocated to channel A cannot use channel B.

Additionally, in this method for static allocation of channels in the related art CDMA packet data system, since channels are allocated in advance before the terminals transmit packet data and packet data is transmitted using only the allocated channel, the efficiency of the channel is decreased because the traffic of the channel is non-uniformly distributed.

Additionally, in some systems, when a prescribed period of time elapses after the occurrence of the traffic, the base station checks the traffic state for a period of time, and reallocates a predetermined number of terminals to the channel. However, this method has the disadvantage in that the non-uniformity of the traffic cannot be solved right away, and requires that the traffic state be checked.

The above references are incorporated by reference herein where appropriate for appropriate teachings of additional or alternative details, features and/or technical background.

SUMMARY OF THE INVENTION

An object of this invention is to provide a method of allocating channels in a CDMA system which substantially obviates the problems caused by disadvantages in the related art.

Another object of the present invention is to provide a method for dynamic allocation of channels in a CDMA packet data system which increases the utilization efficiency of multiple channels.

Another object of the present invention is to provide a method for dynamic allocation of files in a CDMA packet data system that increases the transmission rate of packet data by dynamically selecting a channel for each terminal according to the occupied state of the channels.

Another object of the present invention is to provide a method for dynamic allocation of channels in a CDMA packet data systems that increases the utilization efficiency of multiple channels and the transmission rate of packet data by not allocating a static, specific channel to one terminal.

Another object of the present invention is to provide a CDMA packet data transfer method that dynamically allocates multiple channels to a single terminal and to provide information on all channels used in the system to multiple terminals in communication with a base station, checking the occupied state of each channel by a terminal desired to transmit packet data, and thereafter transmitting packet data through an unoccupied channel.

To achieve these objects, in whole or in parts, there is provided a method for dynamic allocation of channels in a CDMA packet data systems having a first step wherein a base station provides information of all channels used in the system to each terminal; a second step wherein the terminal provided with the information of all channels dynamically allocates the channels according to the occupied or unoccupied state of each channel for thereby transmitting one packet data; and a third step wherein the base station receiving the packet data transmits a signal reporting the occupied state of each channel to the terminal through the channel through which the packet data is transmitted.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a preferred embodiment of the present invention, a terminal is not allocated to a specific channel. The terminal transmits packet data not only through a specific channel, but through all channels used in the system.

Thus, when an arbitrary terminal is powered on, the base station 10 transmits information containing all PN codes used in the system to the powered-on terminal. Consequently, the terminal has all PN codes used in the system available to it. Each terminal in the base station 10 can then implement a packet data transmission process over any channel.

Figure 1:
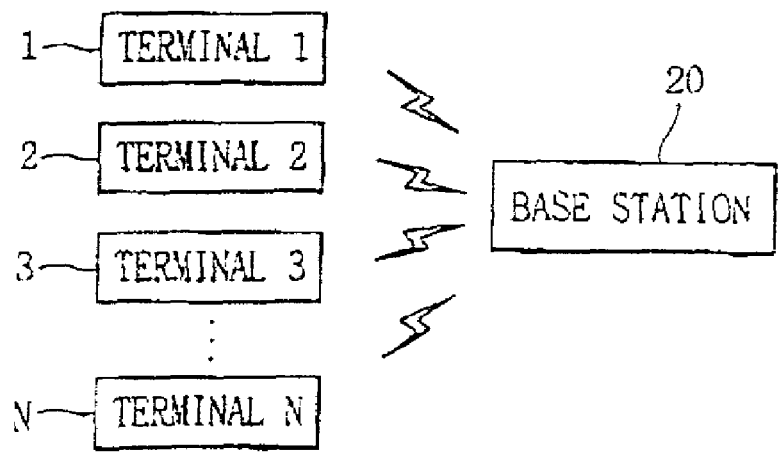
FIG. 1 is a block diagram illustrating the construction of a related art CDMA packet data system.
Figure 2:
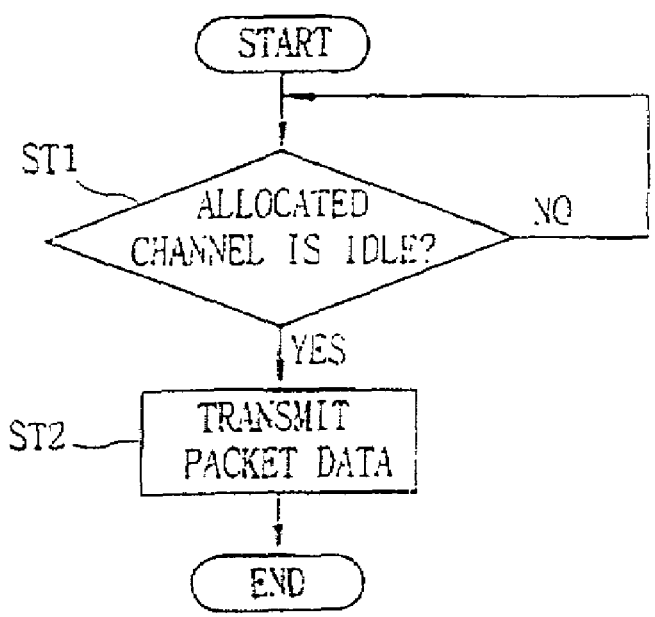
FIG. 2 is a flow chart illustrating a related art method of determining channel allocation wherein each terminal transmits packet data using a statically allocated channel.
Figure 3:
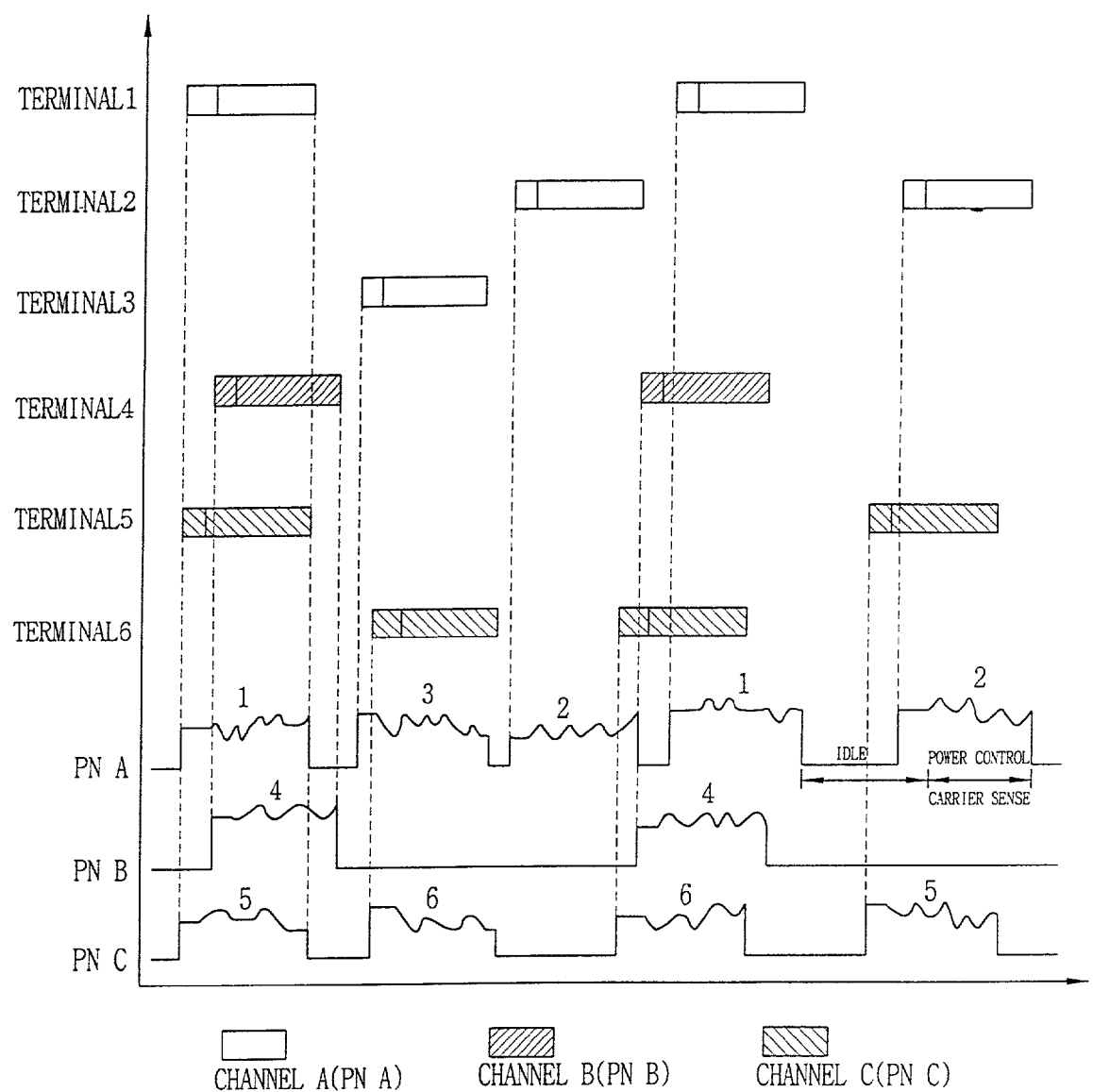
FIG. 3 is a drawing illustrating packet data transmission using a statically allocated channel in a CDMA packet data system according to the related art.
Figure 4:
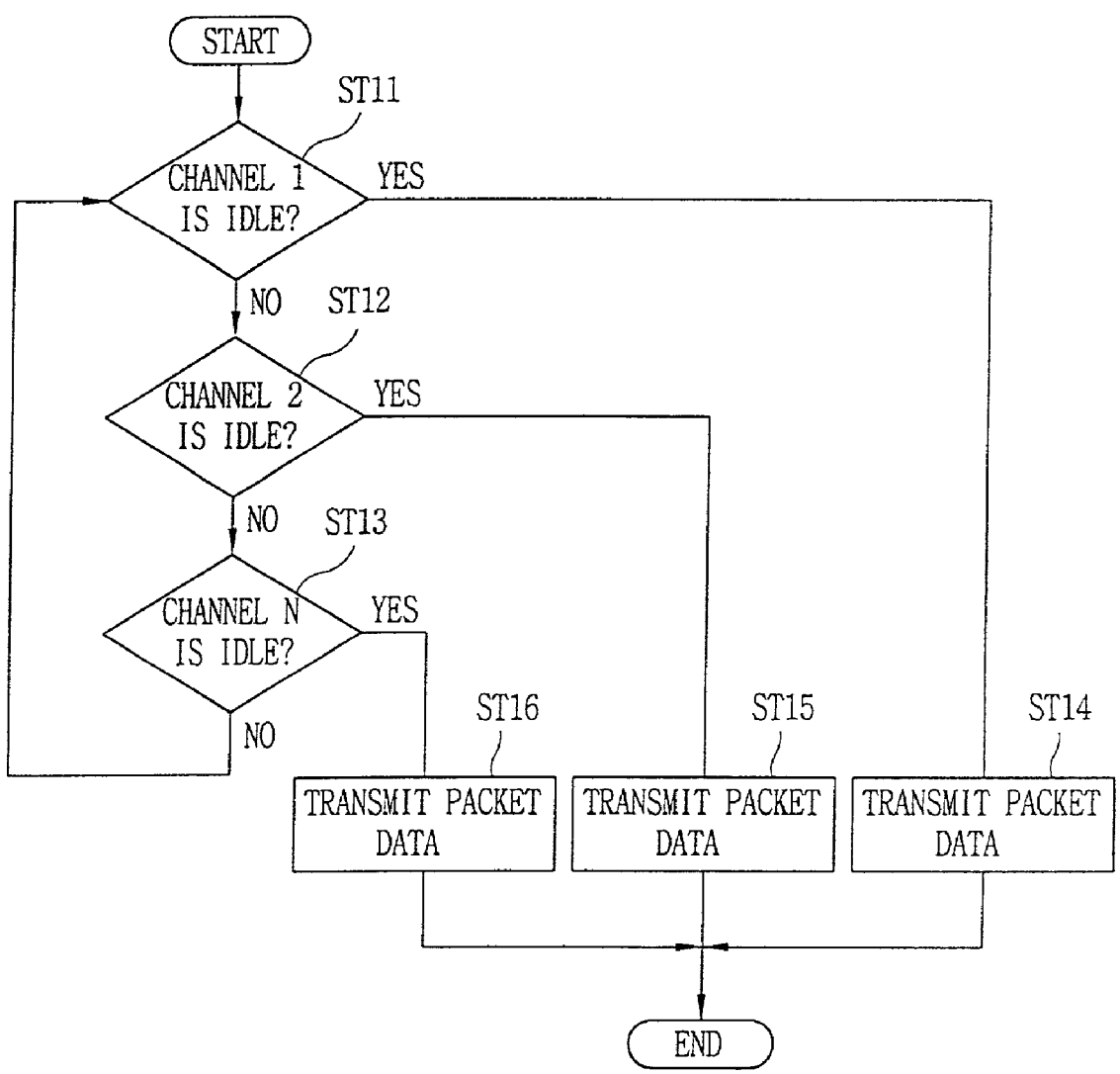
FIG. 4 is a flow chart illustrating a method for dynamic allocation of channels in a CDMA packet data system according to a preferred embodiment of the present invention.

FIG. 4 illustrates a method wherein an arbitrary terminal transmits packet data by dynamic allocation of channels. As illustrated therein, a terminal commencing transmission of packet data first sequentially determines if all of the system channels are occupied by using all of the transmitted PN codes (steps ST11, ST12, and ST13). Next, if it is determined that there is a channel in an unoccupied state, the terminal transmits packet data through that channel. If no channels are available, however, the terminal waits until the occupied state is released (steps ST14, ST15, and ST16).

The method for transmitting packet data by dynamic allocation of channels by a terminal will now be described in further detail.

The terminal commencing packet data transmission first checks whether or not all of the channels used in the system are in the occupied state, by using all of the pre-transmitted PN codes at once, as shown in steps ST11, ST12, and ST13. In other words, the terminal detects whether a power control signal (signal for informing channel occupation) or an idle signal (channel occupancy release signal) is transmitted from each channel. This is done simultaneously by monitoring all of the channels in a parallel mode.

If the terminal determines that there is an idle channel, the terminal sends packet data through the available channel. If, however, there is no idle channel, the terminal waits until an idle channel is generated, as shown in steps in ST14, ST15, and ST16.

Figure 5:
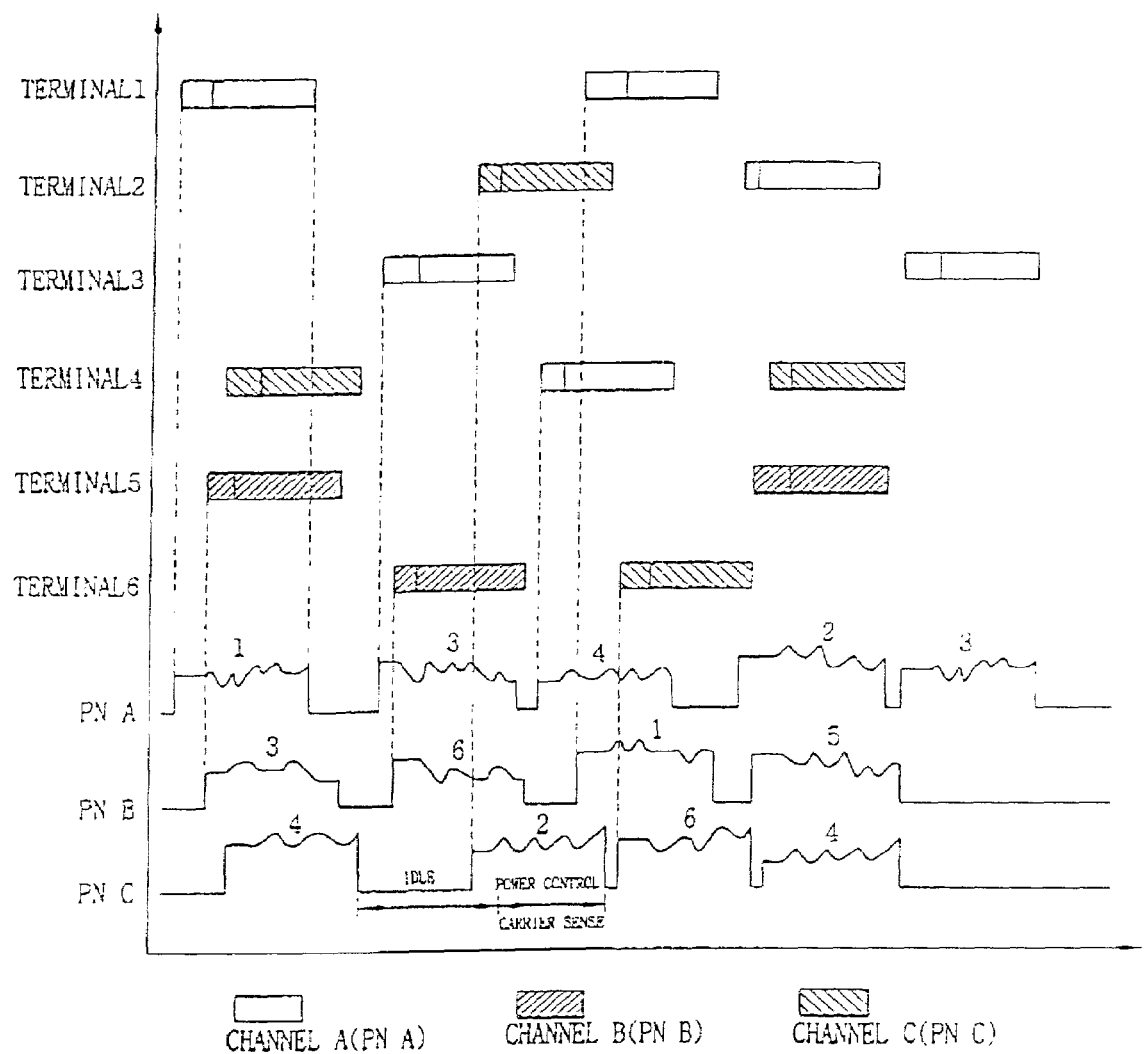
FIG. 5 is a drawing illustrating an example of a packet data transmission using a statically allocated channel according to the preferred embodiment of the present invention.

FIG. 5 illustrates the channel allocation method according to the preferred embodiment. Referring to FIG. 5, there is depicted an exemplary situation where there is one base station 10 and six terminals 1 through 6. The number of channels used in the system is three, to wit, A, B, and C. Terminal 1 simultaneously monitors channel A, channel B, and channel C in parallel mode. At this time, since there is no terminal using any of the channels, the base station 10 preferably transmits an idle signal through all channels.

Therefore, when terminal 1 commences a data packet transmission, it can transmit the packet data immediately. The transmitted packet data includes a preamble and data. The preamble is used so that the base station acquires phase and synchronization.

The base station thus acquires phase and synchronization upon receipt of the preamble in the packet data, and thereafter transmits a power control signal to the terminal, to control the power of the terminal. The power control signal is preferably transmitted through the channel in which the packet data is being transmitted. At this time, since the base station implements the power control of a mobile station (terminal) in units of 1 msec, a signal indicating whether the channel is occupied is transmitted to the terminal. Thus, the terminal should preferably monitor whether the channel is occupied in units of 1 msec. In addition, when the packet of data has been received, an idle signal indicating the release of channel occupancy is generated.

In order for terminal 5 to send packet data, it preferably monitors whether channel A, channel B, and channel C are occupied every 1 msec. Thus, the occupied state of channel A is detected using a first PN code (PN A), the occupied state of channel B is detected using a second PN code (PN B), and the occupied state of channel C is detected using a third PN code (PN C). Therefore, if it is determined that a power control signal is currently being broadcasted, the channel is deemed to be in the occupied state. If, however, it is determined that an idle signal is being broadcasted, the channel is deemed to be in the idle state.

Referring to the example depicted in FIG. 5, as a result of detecting whether or not each channel is occupied, channel A is in the occupied state because it is used by terminal 1. Channel B, however, is in the idle state, so terminal 5 transmits packet data through channel B.

Similarly, when terminal 4 is about to send packet data, it checks the occupied state of channel A, channel B, and channel C. At this time, as illustrated in FIG. 5, if channel A and channel B are in the occupied state and channel C is in the idle state, terminal 4 transmits packet data using channel C.

Next, when terminal 3 is about to send packet data, it continues to monitor the state of the channels because all the channels are in the occupied state. Thus, it searches for an idle channel. When channel A completes the transmission of one packet data, the base station 10 stops the power control over channel A, and transmits an idle signal. Hereupon, terminal 3 transmits packet data through channel A.

In this manner, each terminal 1 through 6 checks the occupied state of all channels used in the system, and thereafter transmits packet data by dynamic utilization of an idle channel.

The channel that the terminal uses to detect whether a channel is occupied and the channel that the base station uses to transmit a signal to indicate whether a channel is occupied are the same signaling channel.

In addition, when the terminal transmits packet data to the base station, a traffic channel is preferably used, and when the base station transmits a power control signal for the power control of the terminal, a signaling channel is preferably used. They still use the same PN code. However, it is assumed that the same channel means the same PN code to help in understanding the description of the invention.

As described above, in the method for dynamic allocation of channels in a CDMA packet data system according to the preferred embodiment has many advantages. For example, the utilization efficiency of multiple channels is increased and the transmission rate of packet data is increased by dynamically allocating multiple channels to each terminal by providing information on all channels used in the system, respectively, to multiple terminals in communication with the base station, checking the occupied state of each channel by a terminal desired to transmit packet data, and thereafter transmitting packet data through an unoccupied channel.

In addition, when the occupied or unoccupied state of all channels used in the system is detected, the time taken for the detection is reduced irrespective of the number of channels by detecting the occupied or unoccupied state of all channels in a parallel mode at one time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for allocating channels in a CDMA packet data system, comprising:

providing channel availability information for each of a plurality of channels, the channel availability information being provided from a base station to each of a plurality of terminals such that each of the terminals receives the channel availability information of each of the plurality of channels;

dynamically allocating available channels to corresponding ones of the plurality of terminals to allow transmission of packet data according to an available or unavailable state of each channel; and transmitting a state signal from the base station over each of the allocated channels indicating the unavailable state of the allocated channels, wherein dynamically allocating the available channels comprises:

for each of the plurality of terminals, simultaneously monitoring each of the plurality of channels in parallel to detect whether the state signal indicating channel availability indicates a channel is idle.

2. The method of claim 1, wherein the base station transmits information containing all PN codes used by the base station to each one of the plurality of terminals.

3. The method of claim 1, wherein dynamically allocating the available channels comprises:

sending a packet of data through an idle channel, if an idle channel signal is detected; and waiting until an idle channel is available, if an occupied channel signal is detected.

4. The method of claim 1, wherein simultaneously monitoring each of the plurality of channels comprises detecting on each of the plurality of channels one of a power control signal and an idle signal, wherein the power control signal is an occupied channel signal indicating unavailability of the respective channel, and the idle channel signal indicates channel availability of the respective channel.

5. The method of claim 1, wherein transmitting the state signal from the base station comprises:

transmitting a power control signal through a downward link channel corresponding to the allocated channel through which a packet of data is transmitted when synchronization is acquired using a preamble of the data packet; and transmitting a channel occupancy release signal through the downward link channel corresponding to the allocated channel through which the data packet was transmitted when the data packet has been fully received.

6. The method of claim 1, wherein each of the available channels are dynamically allocated to different ones of the plurality of terminals.

7. The method of claim 6, wherein each one of the plurality of channels comprises a traffic channel and a signaling channel, and wherein the packet data is transmitted over the data channel and the state signal is transmitted over the signaling channel.

8. The method of claim 1, wherein the terminal is not pre-allocated to a specific one of the plurality of channels.

9. A method for transmitting packet data by dynamically allocating channels in a communication system, comprising:

providing channel availability information for each of a plurality of channels, the channel availability information being provided from a base station to each of a plurality of terminals such that each of the terminals receives the channel availability information of each of the plurality of channels;

for each of the plurality of terminals, monitoring the channel availability information for each of the plurality of channels;
determining which, if any, of all of the plurality of channels is in an occupied state using a corresponding plurality of PN codes state, wherein determining the occupied state comprises simultaneously multiplying the PN code for each channel by a signal received from a base station, and the multiplication is performed at a rate equal to a power control signal transmission rate of the base station; and
one of transmitting a data packet through a dynamically allocated unoccupied one of the plurality of channels for transmission, and monitoring each one of the plurality of channels to determine when the occupied state of one of the channels is released, if there is no channel in the unoccupied.

10. The method of claim 9, further comprising:
establishing in a base station the plurality of channels for data communication, each one of the channels having a unique PN code;
receiving from the base station the unique PN codes of each of the plurality of channels; and
monitoring each of the plurality of channels to determine and occupy the state of each respective channel.

11. The method of claim 9, wherein a terminal is not pre-allocated to a specific one of the plurality of channels.

12. A method for transmitting packet data by dynamically allocating channels in a communication system, comprising:
providing channel availability information for each of a plurality of channels, the channel availability information being provided from a base station to each of a plurality of terminals such that each of the terminals receives the channel availability information of each of the plurality of channels;
for each of the plurality of terminals, monitoring the channel availability information for each of the plurality of channels;
determing which, if any, of all of the plurality of channels is in an occupied state using a corresponding plurality of PN codes state; and
one of transmitting a data packet through a dynamically allocated unoccupied one of the plurality of channels for transmission, and monitoring each one of the plurality of channels to determine when the occupied state of one of the channels is released, if there is no channel in the unoccupied, wherein transmitting the data packet comprises:
determining that a channel using a prescribed one of the plurality of PN codes is in an idle state and transmitting the data packet on the idle channel, if a base station transmits an idle signal on the channel, and
determining that each channel is in an occupied state and waiting until one of the channels becomes idle if the base station transmits a power control signal on each channel.

13. The method of claim 12, wherein a signal transmitted from the base station is multiplied by each one of the plurality of PN codes to determine if the channel associated with a prescribed one of the PN codes is occupied or idle.

14. The method of claim 13, wherein a power control signal transmitted on a channel indicates that the channel is occupied.

15. The method of claim 13, wherein each channel has a unique PN code.

16. The method of claim 13, wherein each channel comprises a signaling channel and a traffic channel.

17. The method of claim 12, wherein a terminal transmitting the data packet has stored in the terminal the PN code for each one of the plurality of channels.

18. A method for informing a plurality of terminals of an occupied or unoccupied state of a plurality of channels of a CDMA system, comprising:
providing a unique PN code for each of the plurality of channels used in the CDMA system, the unique PN code being provided from a base station to each one of a plurality of terminals in communication with the base station such that each of the terminals receives the unique PN code for each of the plurality of channels;
for each of the plurality of terminals, monitoring each of the plurality of channels to detect a signal that indicates an idle channel;
transmitting a power control signal over an occupied channel using the PN code of the occupied channel, wherein the power control signal is transmitted on a channel when the base station acquires synchronization and phase of a data packet transmitted by one of the plurality of terminals; and
transmitting an idle signal over the idle channel using the same PN code as the idle channel, wherein the idle signal is transmitted on the channel when the base station has received the entire packet of data.

19. The method of claim 17, wherein each one of the plurality of terminals has stored therein the unique PN code of each of the plurality of channels.

20. The method of claim 18, wherein a terminal is not pre-allocated to a specific one of the plurality of channels.

21. The method of claim 18, wherein the plurality of terminals are configured to simultaneously monitor channel availability information for each of the plurality of channels of the base station and to transmit data on a first available channel when an occupied state of the first available channel is released.

22. A method of allocating a plurality of channels in a CDMA packet data system, comprising:
receiving channel availability information for each of the plurality of channels from a base station such that each of a plurality of terminals receives the channel availability information of each of the plurality of channels;
dynamically allocating an available channel and transmitting a data packet to the base station using the allocated channel; and
receiving from the base station a power control signal on the allocated channel, wherein the power control signal is released when the data packet has been transmitted, wherein the plurality of terminals are configured to simultaneously monitor channel availability information for each of the plurality of channels of the base station and to transmit data on a first available channel when an occupied state of the first available channel is released.

23. The method of claim 22, wherein the power control signal indicates unavailability of the channel.

24. The method of claim 22, wherein a terminal is not pre-allocated to a specific one of the plurality of channels.

25. A method of allocating a plurality of channels in a CDMA packet data system, comprising:
receiving channel availability information for each of the plurality of channels from a base station such that each of a plurality of terminals receives the channel availability information of each of the plurality of channels;
dynamically allocating an available channel and transmitting a data packet to the base station using the allocated channel; and receiving from the base station a power control signal on the allocated channel, wherein the plurality of terminals are configured to simultaneously monitor channel availability information for each of the plurality of channels of the base station and to transmit data on a first available channel when an occupied state of the first available channel is released, wherein each of the plurality of terminals simultaneously monitors each of the channels in parallel to detect a signal that indicates an idle channel.

* * * * *